UNITED STATES PATENT OFFICE.

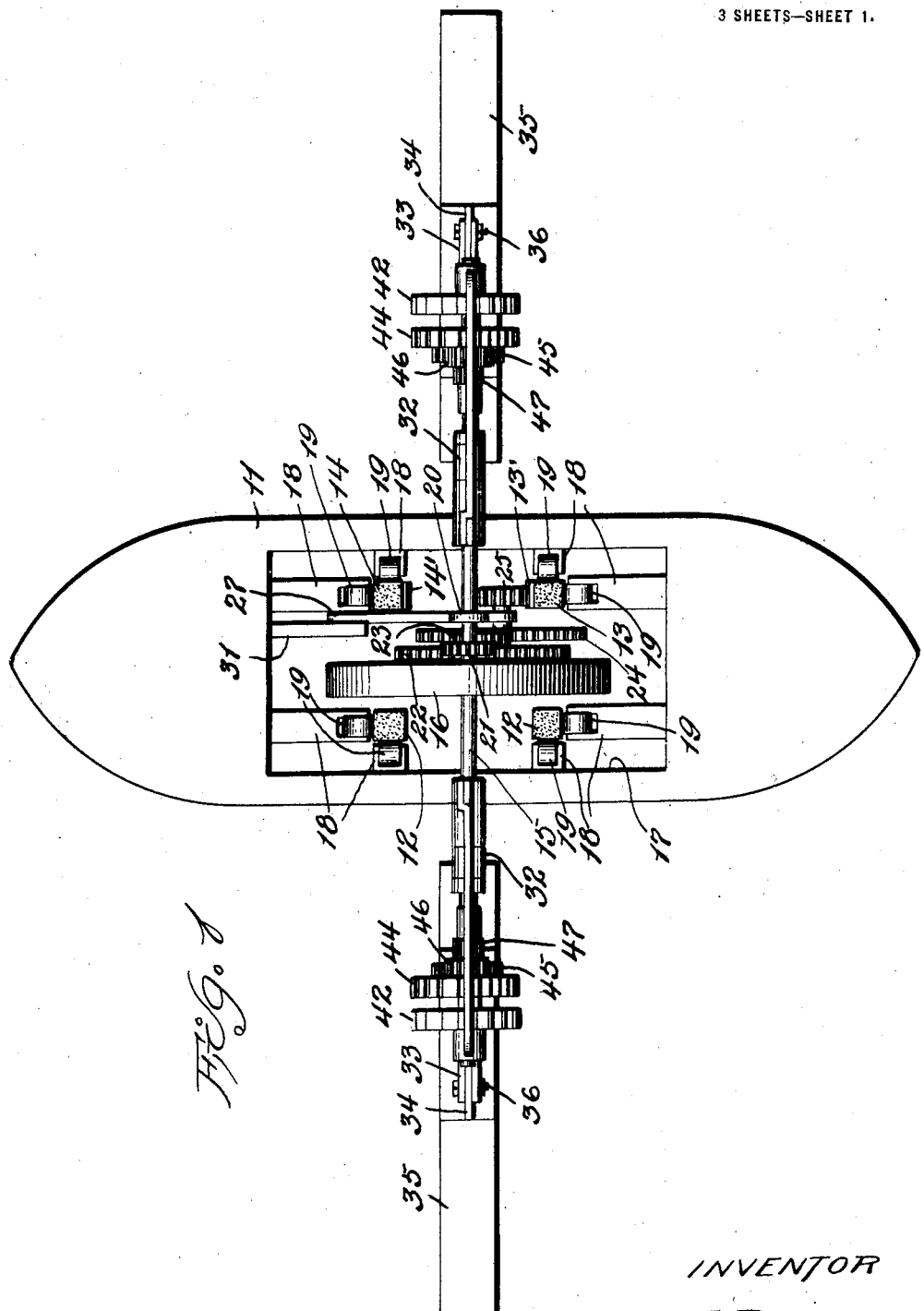

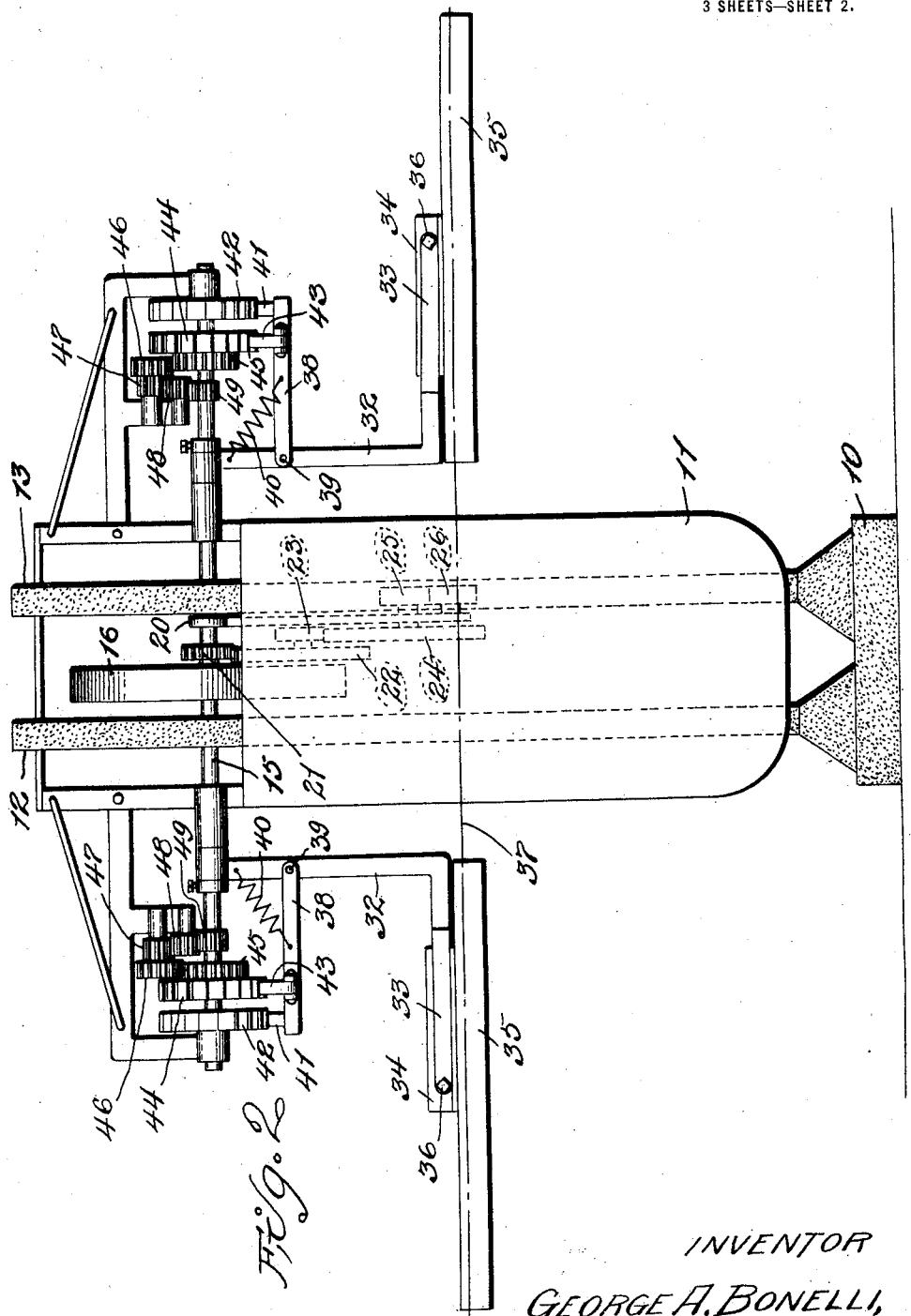

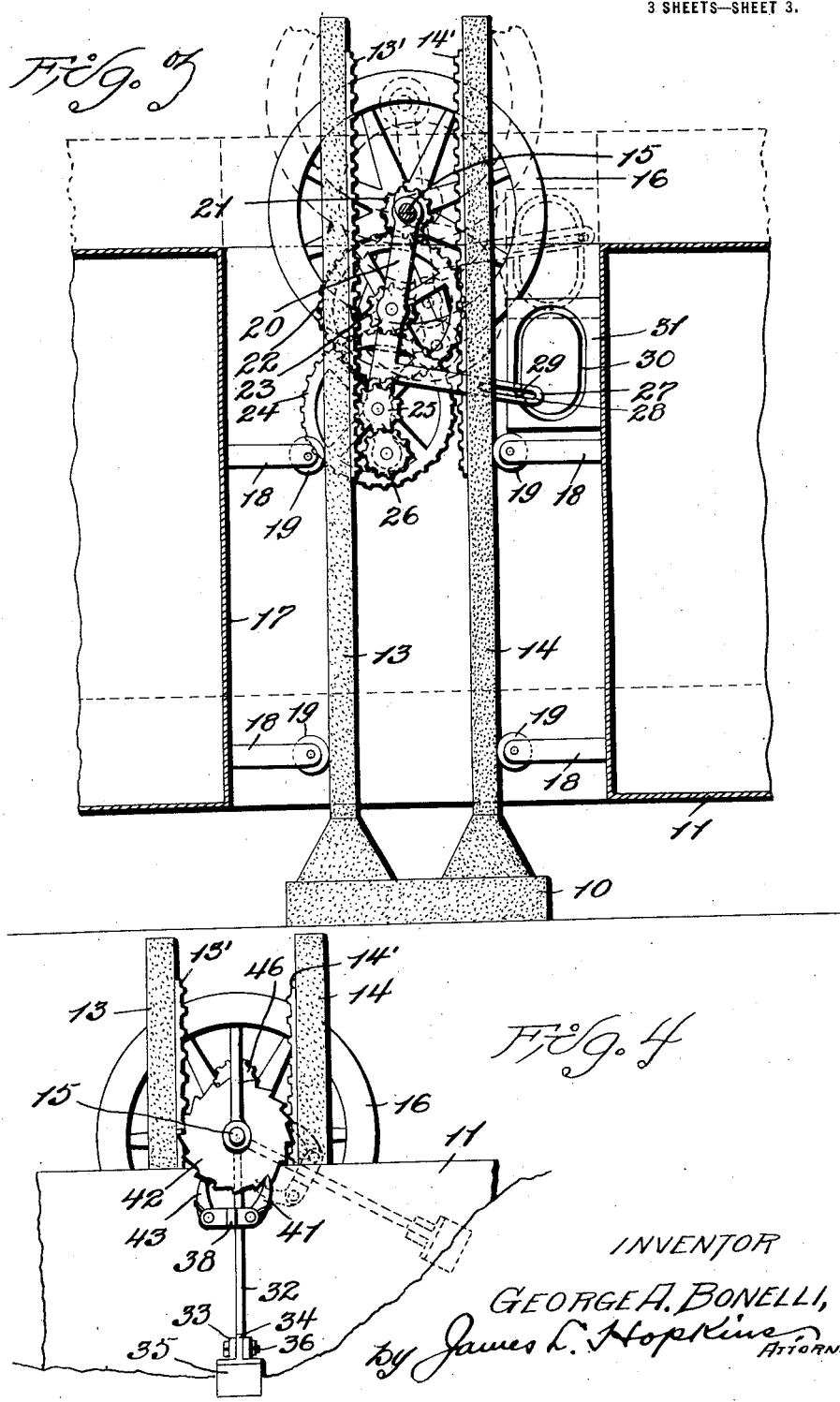

GEORGE A. BONELLI, OF KINGMAN, ARIZONA.

WAVE AND TIDAL MOTOR.

1,405,746.　　　　Specification of Letters Patent.　　Patented Feb. 7, 1922.

Application filed July 20, 1920. Serial No. 397,728.

*To all whom it may concern:*

Be it known that I, GEORGE A. BONELLI, a citizen of the United States, residing at Kingman, in the county of Mohave and State of Arizona, have invented certain new and useful Improvements in Wave and Tidal Motors, of which the following is a specification, reference being had therein to the accompanying drawing.

My invention relates to improvements in wave-and-tidal motors, and has for its object to provide an apparatus having a fixed anchorage in the ocean bed, a hull engaged with and having upward and downward movement in relation to said anchorage and in unison with the tidal movements, wave-motor mechanisms or floats extending from said hull and actuated by both wave and tidal movements, and means for converting the energy created by the several and various movements of the hull and floats into continuous rotary motion of a shaft carried by the hull.

In the accomplishment of this object it is the purpose of the hull to utilize by its rise and fall the power of the tide alone, while the floats co-act with the hull to actuate the shaft carried by the hull by imparting to said shaft the power, to which said floats are subjected, of the waves or breakers. The apparatus thus is intended to derive power from the vertical rise and fall of the water, the to-and-fro motion of the surface-water, the slope and impetus of the waves, and the motion of the distorted verticals.

In the drawings—

Fig. 1 is a plan view of an apparatus embodying my invention.

Fig. 2 is an end elevation of the same.

Fig. 3 is a fragmental longitudinal section of the hull in a position approaching its lower limit of movement.

Fig. 4 is a fragmental side elevation of the apparatus showing the operation of the wave motor units.

The foundation of the apparatus is the block 10 embedded in the ocean floor, to which block 10 the hull or tide-motor 11 is positively anchored against all movement except vertical rise and fall by the piles or columns 12—12 and 13 and 14, said piles being arranged as shown, the pile 13 having the rack 13' upon one of its faces, and the pile 14 having a corresponding rack 14' facing and parallel with the rack 13' (see Fig. 3).

The hull 11 carries the shaft 15 and flywheel 16, which shaft 15 is to be operated by the rise and fall of the hull 11, in which hull 11 there is an aperture 17 extending vertically through said hull 11 (see Figs. 1 and 3). Extending inwardly from the walls of the aperture 17 are the horizontal arms 18 carrying the rollers 19 which in turn contact with the outer vertical faces of the piles 12—12, 13 and 14 to insure the rise and fall of the hull 11 against horizontal displacement.

From the shaft 15 the arm 20 hangs, carrying the train of gear shown in detail in Fig. 3, said train comprising the pinion 21 (fast on the shaft 15), gear-wheel 22 meshed with the pinion 21 and fixed to the pinion 23, the gear-wheel 24 meshed with the pinion 23 and driven by the pinion 25; and the pinion 26 which is idly driven by the pinion 25 during the downward movement of the hull 11 while the pinion 25 engages the rack 13' (see the position illustrated in Fig. 3).

From the arm 20 the slotted arm 27 extends as shown in Fig. 3, its slot 28 having sliding engagement with the pin 29, the pin 29 traveling in the cam-slot 30 in the block 31, which block 31 is secured to one of the vertical walls of the hatch or aperture 17.

The hull 11 having reached the stage shown in Fig. 3, the further ebb of the tide will cause the arm 27 to be drawn laterally carrying the pinion 25 out of mesh with the rack 13' and then bringing the pinion 26 into mesh with the rack 14', causing the pinion 26 to drive the entire train of gear just described, and to effect the rotation of the shaft 15 during the rising movement of the hull 11.

In order to add to the power thus exerted upon the shaft 15 the force of the waves alongside the hull 11, the shaft 15 is of such length as to project beyond the sides of said hull 11, and to carry loosely the crank-arms 32, whose horizontal and outwardly projecting portions 33 are bifurcated and embrace the fins 34 on the upper sides of the floats 35, and are hingedly secured to said fins 34 by the bolts 36.

The float 35 having back-and-forth movement with the waves, the sea level being indicated in Fig. 2 by the line 37, the power generated by such movement is to be conveyed to the shaft 15. The ratchet-arm 38 is hinged to the arm 32 by the pin 39 and yieldably held in horizontal position by the spring 40 (see Fig. 2). The arm 38 carries the ratchet 41, which engages the ratchet-wheel 42 fixed on the shaft 15. The arm 38 also carries the ratchet 43 engaging the ratchet-wheel 44 loose on the shaft 15 but fixed to the gear-wheel 45 which is entrained with the gear-wheels 46, 47 and 48 to actuate the pinion 49 fast on the shaft 15. Thus the opposed ratchet-wheels 42 and 44 will be successively actuated by the back-and-forth movement of the float 35 and the power of each impulse will be imparted to the shaft 15 in the same direction in which said shaft 15 is being driven by the rise and fall of the hull 11.

The apparatus thus described will preferably be mounted with the hull 11 at an angle of substantially 90° to the shore line. A single float 35 or any desired number thereof may be employed in the apparatus, which is capable of various modifications without departure from my invention as defined in the appended claims.

Having thus described my invention, what I claim and desire to have secured to me by the grant of Letters Patent is—

1. In a wave-and-tidal motor, a fixed anchorage in the ocean bed; a hull secured to said anchorage and having upward and downward movement in relation thereto and in unison with the tidal movements; a float secured to said hull and actuated by both wave and tidal movements; and mechanism for converting the power generated by the movements of said hull and float into continuous rotary movement.

2. In a wave-and-tidal motor, a fixed anchorage in the ocean bed; a hull secured to said anchorage and having upward and downward movement in relation thereto; a float secured to said hull and actuated by both wave and tidal movements; a shaft carried by said hull; and means for imparting the power generated by the movements of said hull and said float to said shaft to cause the continuous rotation of said shaft in one direction.

3. In a wave-and-tidal motor, a fixed anchorage in the ocean bed; a hull secured to said anchorage and having upward and downward movement in relation thereto; a plurality of wave-motors secured to said hull; a shaft carried by said hull; and means for converting the power of said hull and wave-motors into the continuous rotary movement of said shaft.

4. In a wave-and-tidal motor, a fixed anchorage in the ocean bed; a hull secured to said anchorage and having upward and downward movement in relation thereto; a plurality of wave-motors secured to said hull arranged in pairs, each pair being disposed on opposite sides of the hull and in alinement with each other; a shaft carried by said hull; and means for converting the power of said hull and wave-motors into the continuous rotary movement of said shaft.

5. In a wave-and-tidal motor, a fixed anchorage in the ocean bed; a hull secured to said anchorage and apertured to surround said anchorage and having upward and downward movement in relation thereto; a float secured to said hull and actuated by both wave and tidal movements; a shaft carried by said hull; and means for imparting the power generated by the movements of said hull and said float to said shaft to cause the continuous rotation of said shaft in one direction.

In testimony whereof I have hereunto affixed my signature.

GEORGE A. BONELLI.